United States Patent [19]
Wortmann et al.

[11] 4,097,400
[45] Jun. 27, 1978

[54] FLAMEPROOF POLYURETHANES

[75] Inventors: Joachim Wortmann, Turnich; Franz-Josef Dany; Joachim Kandler, both of Erftstadt Lechenich, all of Germany

[73] Assignee: Hoechst Aktiengesellschaft, Frankfurt am Main, Germany

[21] Appl. No.: 675,533

[22] Filed: Apr. 9, 1976

Related U.S. Application Data

[63] Continuation-in-part of Ser. No. 527,444, Nov. 26, 1974, abandoned.

[30] Foreign Application Priority Data

Nov. 30, 1973 Germany .............................. 2359700

[51] Int. Cl.² .......................... C08K 5/51; C08G 18/14
[52] U.S. Cl. ..................................... 252/182; 252/8.1; 260/2.5 AJ
[58] Field of Search ................... 260/2.5 AJ, 77.5 SS; 252/182

[56] References Cited

U.S. PATENT DOCUMENTS 3,795,637   3/1974   Kandler .......................... 260/77.5 SS

FOREIGN PATENT DOCUMENTS 2,359,700   6/1975   Germany.

Primary Examiner—C. Warren Ivy
Attorney, Agent, or Firm—Connolly and Hutz

[57] ABSTRACT

Production of flameproof polyurethanes or polyurethane foams containing an ammonium polyphosphate of the general formula:

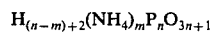

$$H_{(n-m)+2}(NH_4)_m P_n O_{3n+1}$$

in which $n$ stands for a whole number averaging a value of more than 400 up to about 1000, and the ratio of $m:n$ is approximately 1:1, as a flameproofing agent, if desired in combination with a further flameproofing substance.

2 Claims, No Drawings

FLAMEPROOF POLYURETHANES

This application is a continuation-in-part application of application Ser. No. 527,444 filed Nov. 26, 1974 now abandoned.

The present invention relates to flameproof polyurethanes or polyurethane foams, wherein the flameproofing agent producing its valuable properties as early as in the polyurethane batch, is an ammonium polyphosphate having a certain chain length which may be used, if desired, in admixture with further flameproofing substances.

It is known that polyurethanes can be rendered flameproof by means of phosphorus compounds containing nitrogen, e.g., diammonium orthophosphate, which are added to the polyurethane batch. Diammonium orthophosphate as a water-soluble compound is, however, likely to be washed out from the plastics, under the influence of moisture, whereby the plastic is deprived of its initial flameproofness, which is disadvantageous.

It has therefore been proposed (of. German Pat. "Auslegeschrift" No. 1 283 532) to render polyurethanes flameproof by means of substantially waterinsoluble ammonium polyphosphates of the general formula:

in which n stands for a whole number having a average value greater than 10, m stands for a whole number of up to $n + 2$, and m/n stands for a number between about 0.7 and 1.1. It is customary for these known ammonium polyphosphates to be used in proportions between 5 and 15 weight %, based on the batch. Commercially available are only those polycondensation products of the above formula, wherein n averages a value between about 20 and 400, which is determined (cf. van Wazer, Griffiter and Mc. Cullough, Anal. Chem. 26 (1954), page 1755) by terminal group titration once the ammonium polyphosphates have been transformed to the acid stage with the aid of ion exchanger resins.

Ammonium polyphosphates having a degree of condensation n between 100 and 400 are, however, difficult to meter into a polyurethane batch. To permit mechanical processing of the liquid feed components into polyurethanes, it is necessary for them to be intimately blended together within seconds. Prior to blending, it is more particularly customary for the solid ammonium polyphosphates to be pasted up with one of the feed components, preferably with the polyol, or with a preliminary blend prepared from the polyol, catalysts and/or stabilizers and expanding agents. As a result, the phosphate salt is completely wetted and easy to blend with the other components making the batch. Owing to the difference between the density of the ammonium polyphosphate and that of the polyol component or that of the polyol preliminary blend, the phosphate salt begins, once it has been made into a paste, to settle gradually in the mixing vessel and to form a sediment therein. Needless to say irregularly concentrated pastes are initally obtained and reacted later with the isocyanate compound naturally with the resultant formation of differently flameproof polyurethanes.

We have now found that is is possible for the above undesirable phenomenon of sedimentation to be avoided by substituting a highly condensed ammonium polyphosphate for those ammonium polyphosphates which are commonly used. As compared with the above commercially available products, the highly condensed ammonium polyphosphate of the present invention tends to form a gel in aqueous suspension, although it is less water-soluble.

The present invention relates more particularly to flameproof polyurethanes or polyurethane foams containing as a flameproofing agent, between about 0.5 to about 20 weight % of an ammonium polyphosphate, based on the total weight of the polyurethanes, if desired in combination with about 2 to 30 weight % of a further flameproofing substance, based on the total weight, the ammonium polyphosphate having the general formula:

in which n stands for a whole number averaging a numerical value of between about 600 to about 800, and the ratio of $m : n$ is approximately $1 : 1$.

The polyphosphate should preferably be used in a proportion between 1 and 10 weight %, based on the total weight.

It is possible for the ammonium polyphosphate of the present invention to be used alone or in combination with further flameproofing substances, e.g., tris-(2-chloroethyl)-phosphate.

The preparation of the polyurethanes or polyurethane foams does not directly form part of the present invention.

The plastics can be made in known manner by reacting one or more polyhydroxyl compounds of high molecular weight with one or more polyisocyanates in the presence of a catalyst, expanding agents, surfactants and further processing aids. The ammonium polyphosphate, which is used in the present invention may be produced by heating equimolecular quantities of ammonium orthophosphate and phosphorus pentoxide to temperatures between 170° and 350° C in the presence of gaseous ammonia, while continuously and simultaneously mixing, kneading and comminuting the material to undergo reaction.

The polyhydroxyl compounds which may conveniently be used for making polyurethanes include diols, polyols, polyethers, polyesters or polyester amides, which commonly have a molecular weight within the range about 60 and 5000, contain at least two OH-groups per molecule, and have a hydroxyl number within the range about 40 and 700 mg of KOH/gram.

The polyisocyanate which is a further necessary feed component may be an aromatic or aliphatic isocyanate containing at least two NCO-groups per molecule. More particularly, monomeric or polymeric polyisocyanates or so-called prepolymers, the latter being obtained by partial reaction of polyisocyanates with polyols, can be used.

It is customary for the reaction to be accelerated by means of minor proportions of a catalyst or catalyst mixture. The preferred catalysts comprise tertiary amines or organometal compounds, such as bivalent tin or lead compounds.

The polyurethane batch is normally prepared so as to have a minor stoichiometric excess of NCO-groups therein, based on the hydroxyl groups of the polyol compound. It is also possible, however, for the batch to contain a deficiency of NCO-groups. With respect to the hydroxyl groups, the NCO-groups are used within the limits between about 90 and 130 %, preferably 102 and 110 %, based on the stoichiometric quantity.

Depending on the degree of flame-resistance desired to be produced, the polyurethane batch is admixed with between about 0.5 and 20 weight %, preferably between 1 and 10 weight %, of ammonium polyphosphate, based on the total weight of the batch. The ammonium polyphosphate should preferably be incorporated into the polyol prior to blending the latter with the isocyanate compound. It is also possible for the ammonium polyphosphate to be blended with further liquid flameproofing agents and for the blend to be added to the polyurethane batch.

in accordance with the present invention, it is possible to produce compact or foamed polyurethanes. The polyurethane foams are produced with the aid of customary expanding agents, such as low-boiling chlorinated or fluorinated alkanes and/or water. The quantity of expanding agent is selected in accordance with the unit weight desired for the polyurethane foam.

Further processing aids used in making the polyurethanes are foam stabilizers regulating the cell structure, the preferred foam stabilizers being surface-active silicons or polysiloxanes.

Depending on the polyol which is used in each particular case and on the quantitative ratio selected for the individual feed components, it is possible to make rigid or elastic foams. For the production of rigid foams, such as those needed as insulatory material in constructional engineering, it is necessary to use highly cross-linked polyols containing a large number of hydroxyl groups.

As compared with the ammonium polyphosphates, which are customarily used for the flameproofing of polyurethane moulding compositions, those of the present invention are less water-soluble and accordingly not likely to be washed out under the influence of moisture. In other words, the plastics remain flameproof over a prolonged period of time. As a result of the gel-forming properties of the ammonium polyphosphates used in accordance with the present invention, it is possible for them to be uniformly distributed in the polyurethane batch, especially in the polyol preliminary blend, substantially without any significant sedimentation of phosphate. In other words, it is possible for preliminary polyol blends containing phosphate, which are made with the polyphosphates of the present invention, to be stored in view of the fact that the phosphate component is not likely to settle over a prolonged period of time. The following Examples illustrate the invention.

EXAMPLE 1

An ammonium polyphosphate as used in the present invention, which had a degree of condensation $n$ of approximately 700, and a $m/n$-ratio of 1, was tested as to its solubility in water and the result obtained was compared with the solubility values determined for the following commercially available ammonium polyphosphates, which had a degree of condensation $n$ within the range 20 and 400. The following commercially available products were tested:

| 1. VP Kn 504 ®: | Manufacturer Hoechst Aktiengesellschaft, Werk KNAPSACK, Knapsack bei Koln |
| --- | --- |
| 2. Phos-Check P/30 ®: | Manufacturer Monsanto Company, USA |
| 3. Go Cut ®- 100: | Manufacturer Asahi Chemical Ltd., Japan |

VP Kn 504 ® is a product containing 71–72 % of phosphorus ($P_2O_5$) and 14–15 % of nitrogen. It has a specific weight of 1.8 g/cc and decomposes at 330° C. A suspension of 1 g of the product in 100 g of water has a pH-value between 4.5 and 6.

Phos-Check P/30 ® is a product having the following physical properties:

| Phosphorus content: | 32 % |
| --- | --- |
| Specific weight: | 1.79 |
| Decomposition temperature: | 375 – 400° C |
| pH-value of dispersion 10 g/100 g $H_2O$ | 6.5 |
| Refractive index: | 1.48 – 1.49 |

Go-Cut ® – 100 is a product containing 30–32 % of phosphorus and 13–15 % of nitrogen. The product has the following further properties:

| Specific weight: | 0.4 – 0.8 |
| --- | --- |
| Decomposition temperature: | 330 – 450° C |
| Refractive index: | 1.486 |

The solubility in water was determined as follows: 5 g of ammonium polyphosphate was introduced into 100 cc of water and the whole was stirred for 1 hour at 40° C. The resulting solution was rapidly cooled down to room temperature and insoluble fractions were removed by centrifugation over a period of 75 minutes at that temperature. The supernatant clear solution was decanted and boiled for a short while to effect cleavage of dissolved ammonium polyphosphate, if any. The conductivity, density and dissolved phosphate fractions were determined on aliquote portions of the individual solutions. The results obtained are indicated in the following Table 1:

TABLE I

| Product | I | II | III |
| --- | --- | --- | --- |
| VP Kn 504 | 1665 | 1.003 | 20.9 |
| Phos-Check P/30 | 1644 | 1.003 | 19.5 |
| Go-Cut - 100 | 2018 | 1.004 | 31.8 |
| Product of invention | 605 | 1.001 | 9.3 |

With reference to the Table:
Column I: Electric conductivity of solution ($\mu S$ = micro-Siemens)
Column II: Density of solution at 20° C (g/cc)
Column III: Dissolved phosphate fraction at 40° C (wgt.%)

Table 1 shows that the product of the present invention is considerably less water-soluble than the comparative products.

EXAMPLE 2

Two polyurethane foams having the composition described below were prepared with the use of two different batches identified as batch I and batch II, respectively. Batch I contained as the flameproofing agent an ammonium polyphosphate having a degree of condensation $n$ of approximately 700, and batch II was free from flameproofing agent. The following substances were intimately blended at room temperature:

| | Batch | |
| --- | --- | --- |
| | I | II |
| Polyetherpolyol (propoxylated glycerol/sucrose-mixture having | 100 g | 100 g |

-continued

|  | Batch | |
|---|---|---|
|  | I | II |
| an OH-number of 520 mg KOH/g, a molecular weight of about 350 and a viscosity of 6000 centipoises | | |
| Water | 1 g | 1 g |
| Trichlorofluoromethane | 24 g | 24 g |
| Triethylamine | 3 g | 3 g |
| Silicon stabilizer (dimethyl-polysiloxane-polyoxyalkylene ether copolymer) | 1 g | 1 g |
| Ammonium polyphosphate | 10 g | — |

150 g of methylene diphenyl-4,4'-diisocyanate was introduced with vigorous agitation into each of the blends prepared from the above substances and the resulting reaction mixtures were poured into two 5 liter card board containers. After 30 sec. of creaming time and 120 seconds of rise, two rigid polyurethane foam blocks were found to have been formed which were hard within 10 minutes. The foam blocks had the properties indicated in Table 2 hereinafter.

TABLE II

| Properties | | Foam | |
|---|---|---|---|
|  |  | I | II |
| Unit weight | g/l | 36 | 35 |
| Compressive strength DIN (German Industrial Standard) 53 421 | kg/cm² | 2.71 | 2.63 |
| Flexural strength DIN 53 423 | kg/cm² | 2.20 | 2.27 |
| Shear strength DIN 53 422 | kg/cm² | 1.50 | 1.54 |
| Dimensional stability (Change of volume at 70° C and 95 % of relative atmospheric moisture, after 2 weeks). | % | −6.3 | −3.7 |

Burn-up tests (ASTM-D 1692) were made on foams I and II. Foam I was found to be "self-extinguishing" after a burn-up length of 26 mm. Foam II was found to burn off "completely."

EXAMPLE 3

The same components, except for trichlorofluoromethane, as those used in Example 2 for making batch II were used to prepare altogether 8 specimens of a homogenized blend. Each of specimens 1 to 4 were further blended with 10 g of an ammonium polyphosphate having a degree of condensation $n$ of approximately 800, and each of specimens 5 to 8 were further blended with 10 g of Phos-Check P/30 ® having a degree of condensation of approximately 300. The individual specimens were stored in beakers for 4 weeks. Samples were taken from each of specimens 1 to 4 and 5 to 8 at intervals of 1 week and the sedimentation volume of the ammonium polyphosphate, expressed in % of the total volume, was determined. Following this, the sample was homogenized once again by stirring it with a blade agitator at 150 rpm and the time, which was necessary until the homogenization became visible, was identified. The sample was then admixed with 24 g of trichlorofluoromethane and 150 g of methylene-diphenyl-4,4'-diisocyanate and made into a polyurethane foam.

The sedimentation volumes and homogenization periods identified during the test series are indicated in the following Table III.

TABLE III

| Sample | 1 | 2 | 3 | 4 | 5 | 6 | 7 | 8 |
|---|---|---|---|---|---|---|---|---|
| Number of weeks | 1 | 2 | 3 | 4 | 1 | 2 | 3 | 4 |
| Homogenization period (seconds) | 10 | 10 | 15 | 20 | 25 | 40 | 60 | >180 |
| Sedimentation volume % | 0 | 0 | 1 | 6 | 6 | 14 | 12 | 10 |

After having been allowed to stand over a period of 4 weeks, sample 8 was no longer homogenizable. More particularly, a very hard deposit of sedimented ammonium polyphosphate was found to have been formed. Speaking generally, samples 1 to 4 needed shorter homogenization periods than comparative samples 5 to 8. In clear contrast with the latter, samples 1 to 4 were completely homogeneous after 2 weeks.

EXAMPLE 4

The following components were intimately blended at room temperature:

| 100 | g | of a polyesterpolyol (adipic acid-diethyleneglycolpolyester) having an OH-number of 60 mg KOH/g, a molecular weight of approximately 2000, and a viscosity of approximately 20 000 centipoises, |
| 4.7 | g | of water, |
| 1.0 | g | of a silicon stabilizer (polyoxyalkylene-polydimethylsiloxane-copolymer), |
| 1.0 | g | of dichlorotetrafluoroethylene, |
| 0.4 | g | of dimethylbenzyl amine, |
| 0.15 | g | of tin-II-octoate, and |
| 7 | g | of an ammonium polyphosphate having a degree of condensation n of 700. |

51 g of a mixture of the 2,4- and 2,6-isomers of toluylenediisocyanate, which were used in a mixing ratio of 80:20, was rapidly stirred into the blend so made. After 33 seconds of creaming time and 116 seconds of rise, a flameproof elastic polyurethane foam was obtained in a card board container.

A comparative foam free from flameproofing agent was prepared under analogous conditions. The foams so made had the properties indicated in Table IV:

TABLE IV

| Properties of foam | | A | B |
|---|---|---|---|
| Unit weight | (g/l) | 24 | 23 |
| Permanent set after compression (DIN 53 572) after 22 h at 70° C and 50 % compression | (%) | 6.3 | 5.2 |
| Tensile strength (DIN 53 571) | (kg/cm²) | 0.95 | 1.05 |
| Dimensional stability (Change of volume at 70° C and 95 % of relative moisture, after 2 weeks) | (%) | −2.4 | +0.4 |

A = Flameproofing agent added.
B = Free from flameproofing agent.

Burn-up tests (ASTM D 1692) were made on foams A and B. Foam A was self-extinguishing after a burn-up length of 22 mm. Foam B burned off completely.

The above experiment showed that the foam properties were substantially not affected by the addition of the flameproofing agent.

EXAMPLE 5

10 specimens were prepared from a blend homogenized at room temperature and made from the following components:

| 100 | g | of a polyesterpolyol (adipic acid-diethyleneglycolpolyester) having an OH-number of 60 mg |

|      |   |                                                                     |
|------|---|---------------------------------------------------------------------|
|      |   | KOH/g, a molecular weight of approximately 2000                     |
|      |   | and a viscosity of approximately 20000                              |
|      |   | centipoises,                                                        |
| 4.7  | g | of water,                                                           |
| 1.0  | g | of a silicon stabilizer (polyoxyalkylene-poly-dimethylsiloxane-copolymer), |
| 0.4  | g | of dimethylbenzyl amine, and                                        |
| 0.15 | g | of tin-II-octoate.                                                  |

Each of specimens 1 to 5 were admixed with 7 g of Go-Cut ® having a degree of condensation of approximately 200 and each of specimens 6 to 10 were admixed with 7 g of an ammonium polyphosphate having a degree of condensation $n$ of about 600. The individual specimens were stored in beakers over a period of 5 weeks. At one week intervals, samples were taken from each of specimens 1 to 5 and 6 to 10 and the volume of a clear liquids layer, which formed above the suspension due to sedimentation of the ammonium polyphosphate, was determined and expressed in %, based on the total volume of the specimen. Following this, the sample was homogenized once again with the aid of a blade agitator at 150 rpm and the time, which was necessary until the homogenization became visible, was identified. The results obtained are indicated in the following Table V:

TABLE V

| Specimen | 1 | 2 | 3 | 4 | 5 | 6 | 7 | 8 | 9 | 10 |
|---|---|---|---|---|---|---|---|---|---|---|
| Number of weeks | 1 | 2 | 3 | 4 | 5 | 1 | 2 | 3 | 4 | 5 |
| Homogenization period in sec. | 30 | 55 | 90 | 150 | 210 | 10 | 35 | 45 | 60 | 75 |
| Volume of clear liquids layers in % | 9 | 14 | 21 | 25 | 30 | 0 | 1 | 4 | 10 | 12 |

Table V shows that the necessary homogenization periods were shorter for specimens 6 to 10 (invention) than for comparative specimens 1 to 5. In addition to this, specimens 6 to 10 had a less pronounced tendency to sediment. This effect becomes even more obvious on further admixing specimens 1 to 10 with 1 g of water (cf. Table VI):

TABLE VI

| Specimen | 1 | 2 | 3 | 4 | 5 | 6 | 7 | 8 | 9 | 10 |
|---|---|---|---|---|---|---|---|---|---|---|
| Number of weeks | 1 | 2 | 3 | 4 | 5 | 1 | 2 | 3 | 4 | 5 |
| Homogenization period in sec. | 20 | 50 | 80 | 140 | 195 | 0 | 20 | 30 | 50 | 65 |
| Volume of clear liquids layer in % | 11 | 18 | 27 | 32 | 36 | 0 | 1 | 2 | 4 | 7 |

Each of specimens 1 and 6 of Table V were blended with 1 g of dichlorotetrafluoroethylene and each of the resulting blends were reacted with 51 g of a mixture of the 2,4- and 2,6-isomers of toluylene diisocyanate (which were used in a mixing ratio of 80:20). The resulting foams had properties which could not be found to differ significantly from those of the flameproof foam made as described in Example 4.

EXAMPLE 6

6 specimens were made from a blend homogenized at room temperature and prepared from:

|      |   |                                                                     |
|------|---|---------------------------------------------------------------------|
| 100  | g | of a polyether (propoxylated trimethylolpropane having an OH-number of 375 mg KOH/g, a molecular weight of about 400 and a viscosity of 650 centipoises), |
| 35   | g | of trichlorofluoromethane,                                          |
| 1.5  | g | of a silicon stabilizer (dimethylpoly-siloxane-polyoxyalkylene ether-copolymer), |
| 0.5  | g | of triethylene diamine, and                                         |
| 2.0  | g | of triethyl amine.                                                  |

Specimens 2 to 6 were blended with varying proportions of an ammonium polyphosphate having a degree of condensation $n$ of about 700 and each of the specimens were reacted with 100 g of polymethylene-polyphenylenepolyisocyanate containing approximately 32 % of reactive NCO-groups and having a viscosity of 250 centipoises at 20° C. The specimens were placed in card board containers and gave qualitatively reliable rigid foamed blocks of polyurethane. The individual polyurethane specimens were subjected to burn-up tests (ASTM D 1692). The results indicated in Table VII were obtained.

TABLE VII

| Specimen | 1 | 2 | 3 | 4 | 5 | 6 |
|---|---|---|---|---|---|---|
| Quantity of flameproofing agent (g) | 0 | 2 | 6 | 15 | 25 | 40 |
| Category | b | b | s | s | s | s |
| Burn-off velocity (mm/sec.) | 236 | 104 | — | — | — | — |
| Burn-up length (mm) | — | — | 55 | 19 | 11 | 10 | b = combustible
s = self-extinguishing

EXAMPLE 7

Preparation of the ammonium polyphosphate (invention) used in Example 5.

2 640 g of fist-size $(NH_4)_2HPO_4$ and 2 840 g of coarse $P_4O_{10}$ were successively placed in a 7 liter reactor heated to 270° C and provided with rotating mixing, kneading and comminuting implements. Following this, 400 l of $NH_3$ was introduced into the reactor over a period of 1 hour and then 200 l/h of $NH_3$ for a further 2 hour period. A crystalline product with a molar ratio of $NH_3:P = 1.01$ and a condensation degree $n = 600$, was obtained. A 1 % aqueous product suspension contained 0.67 weight % of water-soluble matter at 25° C. 98 % of the granular product was in the form of particles with a size of less than 63 microns.

EXAMPLE 8

Preparation of the ammonium polyphosphate (invention) used in Examples 1, 2, 4 and 6.

The procedure was the same as that described in Example 8 save that the reactor was heated to 290° C. In the resulting crystalline product the molar ratio of $NH_3:P$ was 1.005 and the condensation degree $n$ was 700. A 1 % aqueous product suspension contained 0.6 weight % of water-soluble matter at 25° C.

EXAMPLE 9

Preparation of the ammonium polyphosphate (invention) used in Example 3.

The procedure was the same as that described in Example 8 save that the reactor was heated to 300° C. In the resulting crystalline product the molar ratio of $NH_3:P$ was 1.0 and the condensation degree n was 800. A 1 % aqueous product suspension contained 0.55 weight % of water-soluble matter at 25° C.

The degree of condensation of the ammonium polyphosphates of the present invention was determined by the terminal group-titration method (van Wazer, Griffith and McCullough, Anal. Chem. 26, page 1755 (1954) following transformation of the ammonium polyphosphates into acids by means of ion exchanger resins (van Wazer and Holst, Journ. Am. Chem. Soc. 72, page 639 (1950)).

We claim:

1. A homogenized mixture for the production of flameproof polyurethanes or polyurethane foams by reacting the said mixture with polyisocyanates, the said mixture containing a polyhydroxyl compound of high molecular weight, water, a catalyst, surfactants and ammoniumpolyphosphate as flameproofing substance, the ammonium polyphosphate having the general formula:

$$H_{(n-m)+2}(NH_4)_m P_n O_{3n+1}$$

in which $n$ stands for a whole number averaging a numerical value of between about 600 to about 800, and the ratio of $m : n$ being approximately $1 : 1$.

2. Mixture as claimed in claim 1, containing an ammonium polyphosphate prepared by heating approximately equimolecular proportions of ammonium orthophosphate and phosphorus pentoxide to temperatures between 170° and 350° C in the presence of gaseous ammonia while continually and simultaneously mixing, kneading and comminuting the material to undergo reaction.

* * * * *